METHOD AND APPARATUS FOR CONNECTING GROUPS OF WIRES

Filed Nov. 23, 1966

METHOD AND APPARATUS FOR CONNECTING GROUPS OF WIRES

United States Patent Office 3,438,407

Patented Apr. 15, 1969

3,438,407

METHOD AND APPARATUS FOR CONNECTING GROUPS OF WIRES

William R. Over, Harrisburg, Pa., assignor to AMP Incorporated, Harrisburg, Pa.

Filed Nov. 23, 1966, Ser. No. 596,672
Int. Cl. B21f *15/04;* B21d *39/00;* H01r *43/04*
U.S. Cl. 140—111 5 Claims

ABSTRACT OF THE DISCLOSURE

Corresponding wires of two groups of wires (e.g. twisted pair) are connected by separating the wires of the groups from each other at a location adjacent to the wire ends. The wires of the two groups are positioned against each other and individual electrical connections are formed between corresponding wires of the groups. End portions of the wires which extend beyond the electrical connections are cut off and removed.

*Specification*

This invention relates to a method and apparatus for connecting the corresponding wires of two groups of wires which extend axially towards each other. The invention is herein disclosed with reference to the splicing of the corresponding wires of two twisted pairs of wires of the type commonly used in the telephone industry. However, alternative uses of the invention will be apparent to those skilled in the art.

The conductors used in the telephone industry are ordinarily provided in cables each of which contains a number of wire pairs. The pairs are helically twisted together and are commonly referred to as twisted pairs. The larger cables contain as many as 2,700 pairs or 5,600 individual wires. The two wires of each twisted pair cooperate with each other, for example, one wire may function as a signal conductor and the other wire may function as a ground conductor and the lineman who services such cables thinks of the conductors in the cable in terms of pairs rather than in terms of individual wires. When two ends of a telephone cable are spliced to each other, a given pair in one end must be connected to the corresponding pair of the other end, and, moreover, the corresponding wires of the pairs must be connected to each other selectively rather than indiscriminately. Ordinarily, the pairs are color-coded, for example, one wire having red insulation and one wire having white insulation so that the lineman making connections can readily connect the red wire of the one end of the cable to the red wire of the other end, and the white wire of the one end of the cable to the white wire of the other end of the cable.

It is among the objects of the present invention to provide an improved method and apparatus for connecting the corresponding wires of two pairs of wires in one operation. It is a further object of the invention to provide an improved method and apparatus for connecting the corresponding wires of two groups of wires to each other. A still further object is to provide a method and apparatus for splicing or connecting twisted pairs of wires in which the technician or lineman treats or handles each pair as a single unit rather than as two individual wires. A still further object is to provide a method and apparatus for connecting pairs of wires in which excess wire in the two pairs is trimmed at the time the connection is made and disposed of in an operation which is carried simultaneously with the connecting operation. A still further object is to provide an improved crimping apparatus for connecting twisted pairs of wires.

These and other objects of the invention are achieved in a preferred apparatus embodiment comprising first and second wire connecting means, each of which is capable of making a lap-type connection between two wires. The wire connecting means are disposed in side-by-side relationship and means are provided at each end of each connecting means for selectively severing one of the two wires connected by the connecting means. Guide means are provided for locating the individual wires of each pair in one of the connecting means so that one wire from each pair will be located in each of the two connecting means. Upon actuation of the connecting means, the corresponding wires of the two pairs are connected to each other and the scrap wire which extends beyond the connecting means to the wire ends is trimmed at a location adjacent to the connecting means and disposed of. In accordance with the method aspect of the invention, the two wires in each of the two pairs are separated at a location adjacent to their ends, thus forming gaps or open spaces in the ends of the two pairs. The two pairs are then positioned adjacent to each other with their gaps coinciding and with their corresponding wires extending parallel to, and beside, each other. Electrical connections are made by any suitable method on each side of these gaps and the scrap wire which extends beyond the electrical connections is disposed of. The electrical connection can be made by any suitable method, for example, crimping or welding.

Figures 1, 2, 10:
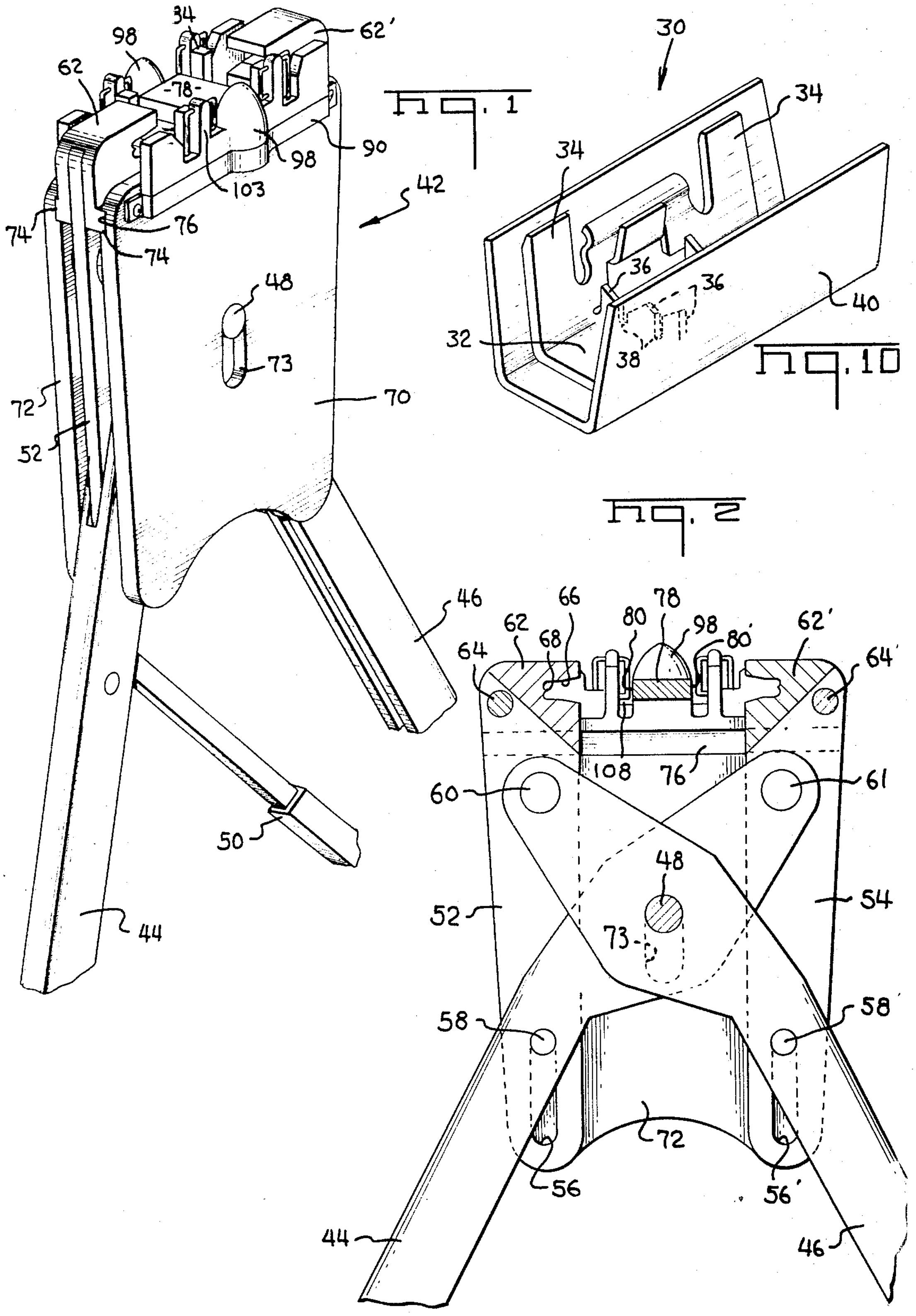
FIGURE 1 is a perspective view of one form of apparatus for connecting pairs of wires in accordance with the invention.
FIGURE 2 is a sectional side view of the tool of FIGURE 1 showing the crimping dies in their open or separated positions.
Figures 6, 7, 8, 9:
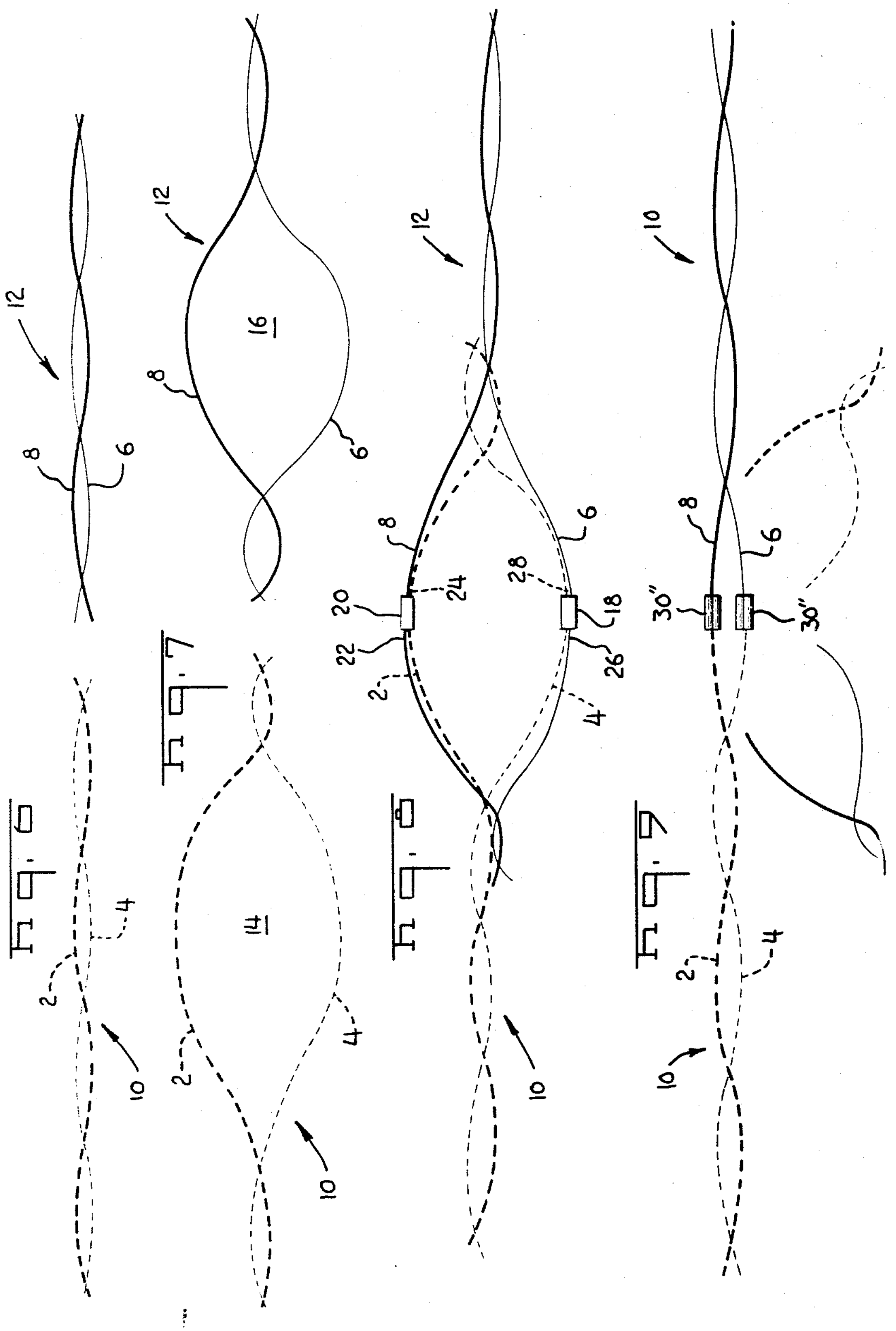
FIGURE 6 is a schematic view showing two twisted pairs of wires which are to be connected to each other.

FIGURES 7 and 8 schematically illustrate the steps for connecting the wires of FIGURE 6 in accordance with the method aspect of the invention;

FIGURE 9 is a perspective view of a splice between the corresponding wires of the twisted pairs of FIGURE 6; and FIGURE 10 is a perspective view of a preferred form of crimpable electrical connector which is used with the tool shown in FIGURE 1.

Referring first to FIGURES 6–8, the reference numeral 10 denotes a twisted pair of conductors 2, 4, which are to be connected to a second twisted pair 12 comprising conductors 6, 8. Twisted pairs of conductors are commonly used in the telephone industry for ease of identification of the individual wires in a cable and then connections are made between two ends of a cable, a specific conductor in one pair must be connected to a specific conductor of the other. Thus, in FIGURE 6, it can be assumed that the conductor 2 of pair 10 is a signal conductor and must be connected to the signal conductor 8 of the pair 12. The ground conductor 4 of the pair 10 thus must be connected to the ground conductor 6 of the pair 12.

In accordance with the method aspect of the present invention, the conductors 2, 4 of the pair 10 are separated or pulled apart at a location adjacent to their ends to form a gap 14. The conductors 6, 8 of the pair 12 are similarly pulled apart to form a gap 16. I prefer to leave the end portions of the conductors of the two pairs intertwined as indicated for convenience in handling. The two pairs 10, 12 are next positioned against each other as shown in FIGURE 8 with the gaps 14, 16 substantially coinciding with each other and with the conductor 4 extending alongside the conductor 6 and with the conductor 2 extending alongside the conductor 8. The conductors 6, 4 are then connected to each other at 18, that is, at a point midway between the ends of the gaps 14, 16 and the conductors 2, 8 are similarly connected at 20. The electrical connections 18, 20 can be made in any suitable manner. There is described below a preferred form of hand tool for making crimp connections at 18 and 20 although the connections may be made by welding or any other method involving mechanical interlocking crimping or bonding. Concomitantly with making of these connections 18, 20, the end portions of all of the conductors which extend beyond the electrical connections are trimmed as indicated at 22, 24, 26, and 28. In accordance with the broadest aspects of the method of the invention this trimming operation can be carried out immediately after the electrical connecting operation by means of a pair of linemans shears or other severing devices. The completed splice between the pairs 10, 12, is shown in FIGURE 9 with the electrical connections 30″ being crimped connections of the type which will be described below.

A salient advantage of the method aspect of the invention as described immediately above is that the individual pairs 10, 12 are treated as units even though each pair comprises two wires. An immediate benefit which accrues from this fact is that the production rate of the lineman connecting the individual pairs in a multi-pair cable is substantially increased since he does not handle the wires individually. Thus the time required to form the gaps 14, 16 and to superimpose the gaps on each other as shown in FIGURE 8 is about the same as would be required to position two individual wires of the pairs in a suitable hand tool or other connecting device for forming a single connection. A further advantage of the method as described above is that the time required to identify the pairs being connected is substantially reduced. Thus, if the lineman identifies the pair 10 in one bundle or cable and the pair 12 in the other, he has completed the identification process for connecting the wires of those two pairs and he need only superimpose the separated portions of the pairs in the proper manner and connect the corresponding wires to each other, that is, the ground wire of pair 10 to the ground wire of pair 12 and the signal wire of pair 10 to the signal wire of pair 12. The overall result is a substantial time saving and a corresponding increase in the productivity of the technician.

FIGURE 1 shows a preferred form of hand tool 42 which can be used to practice the method of FIGURE 6–8 and to form crimped connections between the corresponding wires of the pairs. These crimped connections are made with connectors 30 (FIGURE 10) each of which has a U-shaped metallic channel portion comprising a web 32 and sidewalls 34. A pair of spaced-apart tongues 36 are struck-up from the web 32 and these tongues have parallel notches 38 which extend downwardly from their upper edges. The notches 38 have a width substantially equal to, or slightly less than, the diameter of the conducting cores of the wires which are to be connected so that when the wires are forced into the notches, the insulation of the wires will be penetrated by the edges of the notches. The metallic cores of the wires will then make electrical contact with the tongues and, therefore, with the connectors. In use, the two wires which are to be connected to each other are positioned between the sidewalls 34 in overlapping side-by-side relationship with each wire being disposed above a pair of aligned notches 38 of the tongues 36. The sidewalls 34 are then bent inwardly to force the wires downwardly into the notches and form the crimped connections. Advantageously, insulation is provided on the external surface of the connector, the disclosed connector having a film 40 of suitable plastic which extends axially beyond the end of the connector and upwardly beyond the edges of the sidewalls so that the finished crimped connections will be completely insulated. Reference is made to my copending application Ser. No. 573,078 and to application Ser. No. 432,621, now Patent No. 3,320,354, for further details of connectors of the type shown in FIGURE 10.

The tool 42 has a pair of cross-handles 44, 46 which are pivoted together at 48 adjacent to their upper ends. The handle 46 is bifurcated at its upper end and its two ears straddle the upper end portion of the handle 44. Both handles have generally channel-shaped cross-sections for reasons which will be apparent from the description presented below of the tool head. Advantageously, a full stroke compelling mechanism 50 is mounted between the handles as disclosed in U.S. Patent 2,618,993 to insure that after the beginning of an operating cycle, the technician will close the handles to the limit of their travel so that the operation will be completely carried out.

Mounting plates or bars 52, 54 are pivotally connected at 60, 61 to the upper ends of the handles 46, 44. These mounting bars or plates extend downwardly through suitable openings in the handles and have elongated slots 56, 56′ in their lower ends. Pins 58, 58′ are provided in the handles 44, 46 and extend through slots 56, 56′ to permit relative upward movement of the bars 52, 54 with respect to the handles during movement of the handles relatively towards each other.

The head portion of the tool 42 has a pair of back-to-back crimping mechanisms thereon which are, in many respects, identical to each other. Accordingly, the same reference numerals, differentiated by prime marks, will be used to identify the corresponding parts of the two mechanisms and only the mechanism which appears on the left in FIGURE 2 will be described in detail. The crimping mechanism on the right will be described to the extent necessary for an understanding of operation of the tool.

A die block 62 is mounted on the upper end of plate or bar 52 by means of a pin 64, the upper end of the bar or plate 52 extending into a suitable slot in the die block and the pins 64 extending through the die block and through the upper end portion of the plate 52. Die block 62 has on its right hand side as viewed in FIGURE 2, a forming recess 66. This forming recess or forming cavity has generally convergent sidewall portions and which at their inner end are reversely curled towards each other to form a cusp 68. The width of this forming recess is slightly greater than the width of the connector 30 so that when the die moves relatively over the connector, the connector sidewalls will be bent inwardly towards each other and then towards the connector web. Details of this type of crimping die are more fully described in the above-identified copending applications Ser. Nos. 573,078 and 432,621.

The head portion of the tool is contained between side plates 70, 72, the previously identified pivot pin 48 extending through elongated slots 73 in these side plates 70, 72 to permit closure of the handles and relative upward movement of the side plates and the head. The die block 62 has laterally extending flanges 74 which are received in suitable grooves or guideways 76 on the opposed surfaces of the side plates 70, 72, an arrangement which permits the die blocks 62, 62′ to move relatively towards each other when the handles are closed. The connectors which are to be crimped onto the wires are supported on surfaces 80, 80′ of an anvil 78 which is integral with, and extends between, the side plates 70, 72 directly above the pivot pin 48. The connectors 30 positioned on the surfaces 80, 80' thus face the forming surface portions 66, 66' of the die blocks as will be explained more fully below.

Figures 3, 4:
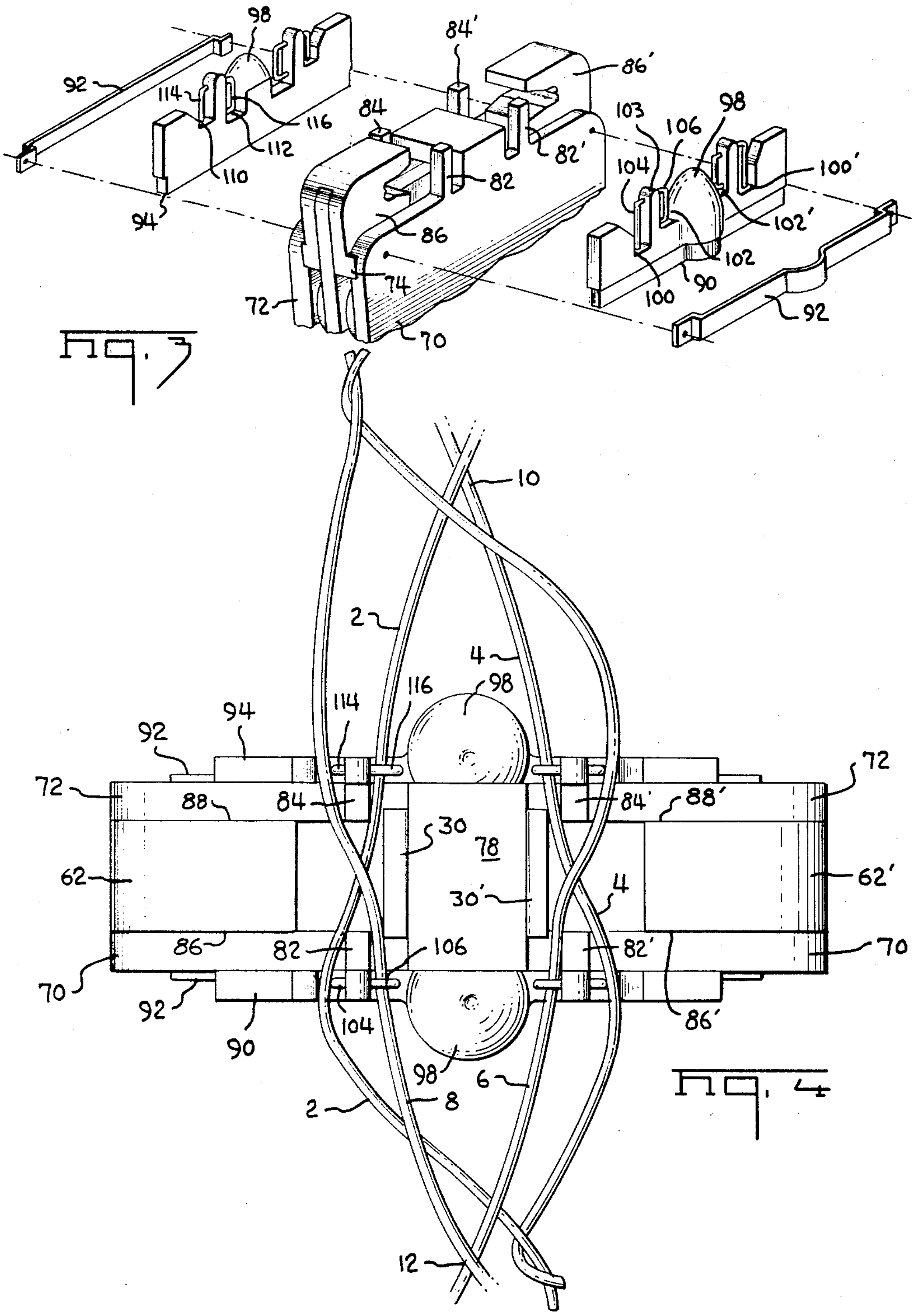
FIGURE 3 is a perspective exploded view showing the upper portion of the tool of FIGURE 1.
FIGURE 4 is a top plan view of the tool shown in FIGURE 1 showing the crimping dies in their separated or open conditions and showing the wires of two pairs of conductors positioned in the tool at the beginning of an operating cycle.

A shear bar 82 is integral with, and extends from, the upper side or edge of the plate 70 in spaced relation to the surface 80 and between this surface and the right hand end of the die block 62 when this die block is in its retracted position (FIGURE 3). A corresponding shear bar 84 is provided at the same location on the plate 72, these two shear bars 82, 84 being in alignment with each other on opposite sides of the die block. Corresponding shear blocks 82', 84' are provided on the right hand side of the plate as best shown in FIGURE 3. These shear bars 82, 84 cooperate with sides 86, 88 of the die block to shear the wires concomitantly with crimping as will be explained below.

In order to facilitate the positioning of the wires in the tool, I provide a guide member, blocks 90, 94, which may be of molded plastic such as polyurethane or the like and which are held against the plates 70, 72 by suitable brackets 92. These two guide members are similar to each other excepting for the depth of various wire receiving slots on their upper sides as will be explained more fully hereinbelow.

The guide member 90 and the guide member 94 both have centrally located generally conical bosses 98 intermediate their ends which are disposed on each side of the anvil block 78. The guide member 90 has two notches 100, 102 on the lefthand side of the boss 98, the notch 100 being relatively deeper than the notch 102 and the two notches being separated by an upwardly extending projection 103 of the molding. A short section of bent wire 104 is mounted in the notch 100 and extends downwardly and into the floor or base of this notch as shown in FIGURE 3 to reduce the effective width of the notch into which the wire is placed and to accurately locate the wire in the notch. A short section of wire 106, which is U-shaped in this case, is provided in the notch 102 and has its legs extending into the sides of the projection 103. This arrangement in the notch 102 provides a space indicated at 108, FIGURE 2, in the base of the notch between the upper surface of the notch and the lower side of the wire guide member 106. This space should be sufficient to permit one of the wires being connected to move against the side of the projection 103 for reasons which will be apparent from the description of operation given below.

The notch 102' is substantially similar to the notch 102 and the notch 100' is similar to the notch 100 excepting, of course, that these notches 102', 100' face in the opposite direction from the notches 100, 102.

The guide member 94 has notches 110, 112 on the left (as viewed in FIGURE 3) of the boss 98. In this instance, however, the notch 110 (which is remote from the boss 98) is relatively shallow while the notch 112, which is adjacent to the boss 98, is relatively deep. The wire guide members 114, 116 are in other respects similar to the previously identified guide member 104, 106. Again, the notches 110', 112' are similar to the notches 110, 112.

Figure 5:
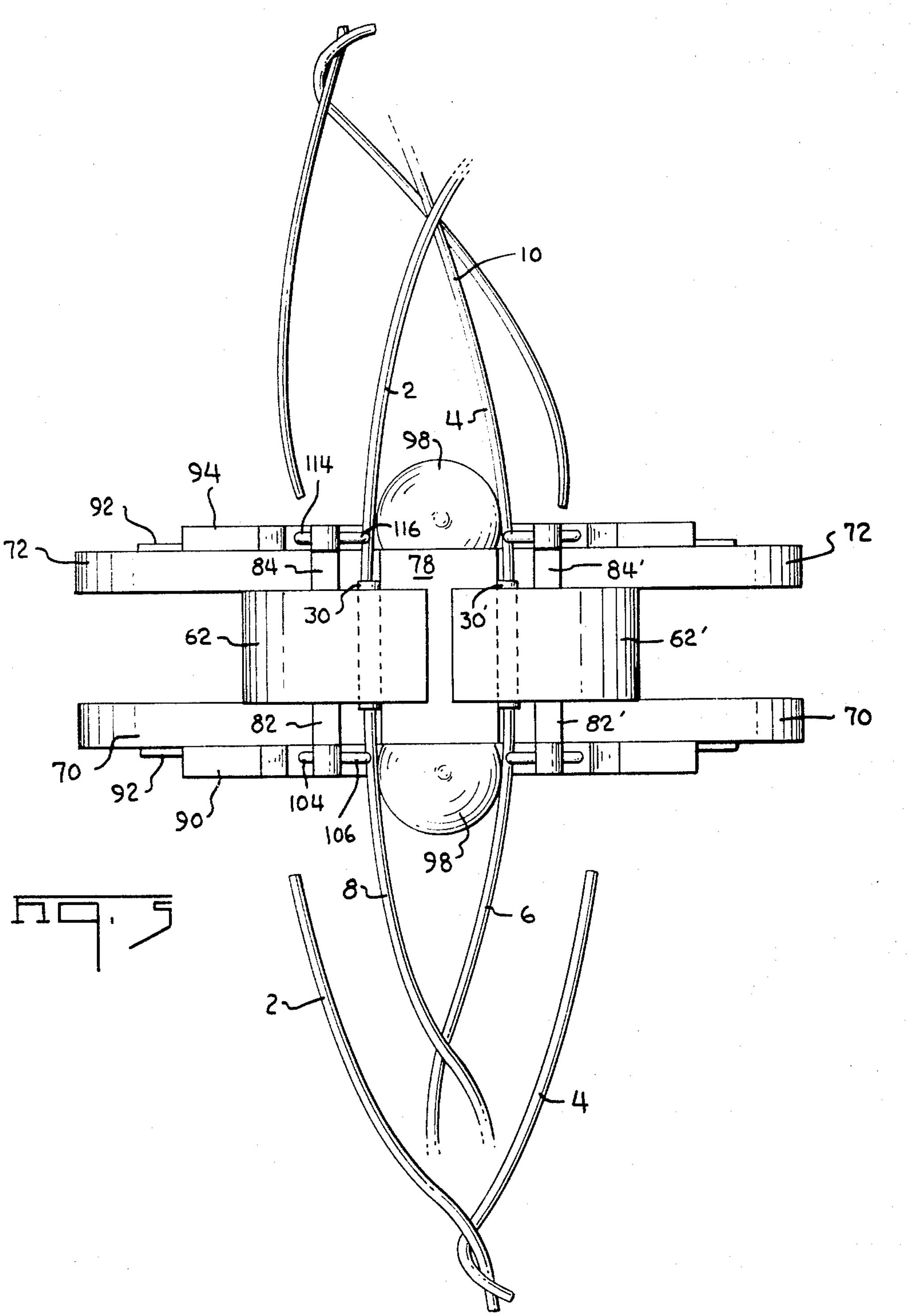
FIGURE 5 is a view similar to FIGURE 4 but showing the positions of the parts at the conclusion of the operating cycle after the wires have been connected and the scrap wire has been trimmed from the crimped connections.

The operation of the disclosed tool embodiment of the invention is as follows. The parts at the beginning of the operating cycle will be in the positions shown in FIGURES 1, 2, and 4 with the die blocks 62, 62' in their remote positions with respect to the anvil supporting surfaces 80, 80' and with the handles 44, 46 in their open conditions. The operator first separates the two wires of the pair 10 at a location adjacent to the ends as generally illustrated in FIGURE 7, and as more specifically shown in FIGURE 4. He then lowers the separated portion of the pair 10 over the head of the tool with the wire 2 extending on the left (as viewed in FIGURE 4) of the bosses 98 and with the wire 4 extending to the right of these bosses. The wire 2 is located in the notches 112, 100, that is, the deep notches on the left hand side of the tool as viewed in the drawing. He similarly locates the wire 4 in the notches 112', 100'; again, the deep notches on the right hand side of the tool. The technician then picks up the pair 12, forms a gap adjacent to the end of the pair by separating the two wires, and moves this pair over the bosses 98 with the wire 8 to the left of the bosses 98 in FIGURE 4 and with the wire 6 on the right hand side of the bosses. The wire 8 is located in the notches 102, 110 and the wire 6 is similarly located in the notches 102', 110'. These wires, 6, 8 are thus located in the shallow notches. The operator then positions connectors 30, 30' on the anvil surfaces 80, 80' with the web portions of the connectors supported on the surfaces and with the sidewalls facing the forming cavities 66, 66' of the dies. Finally, the operator squeezes the handles 44, 46 causing the die blocks 62, 62' to simultaneously move towards each other and towards the forming surfaces 80, 80' of the anvil 78. During initial movement, the sides 86, 88, 86', 88', of these die blocks move relatively past the shearing members 82, 84, 82', 84', and the projecting end portions of all of the wires are severed. The scrap wire ends shown in FIGURE 5 fall away or are removed from the working area. During further movement of the die blocks relatively towards the supporting surfaces the wires are moved relatively between the sidewalls 34 of the connectors positioned on the anvil supporting surfaces and the sidewalls of the connectors are thereafter bent towards the connector webs to force the wires into the notches 38 of the tongues 36 and establish the electrical connections.

The reentrant space 108 between the U-shaped wire guide in the notches 102, 102' and 112, 112' are provided in order that the wires might be located as shown in FIGURE 4 such that the portions of the wire entering the tool will not bear against, or interfere with, the connectors 30, 30' supported on the anvil surfaces. In other words, the technician moves the wires downwardly over the bosses 98 and then into the space 108 until they occupy the positions shown in FIGURE 4. The wire guide members 106, 116, 106', 116' function to retain the wires in the position shown in FIGURE 4.

The provision of the alternate shallow and deep slots 100, 102, etc., in each of the guide blocks 90, 94 insures that the wires in each of the two crimped connections 30'' in FIGURE 9 will be side-by-side rather than superimposed on each other or crossing each other. For best results with the connector of the type shown in FIGURE 10, the wires should extend parallel to each other and in side-by-side relationship in the connector sidewalls.

The advantages of the method as explained above are generally applicable to the tool of the type shown in FIGURES 1–5 or to any other tool which can be used to carry out the method. With this tool, the scrap wire which extends beyond the electrical connections formed is immediately eliminated when the connections are made and during the same operation which is required to make the connection. The foregoing description of the structure and operation of the tool illustrate the fact that in accordance with the method and in accordance with the principles of the tools disclosed, the technician handles each pair 10, 12 as a unit so that each operation he performs contributes to the electrical connections between four wires rather than between two wires as with prior art methods.

It will be noted that in the disclosed tool embodiment of the invention, the two crimping mechanisms in the tool head are disposed parallel to each other (i.e. such that the connectors 30, 30' in these crimping mechanisms extend parallel to each other) and back-to-back. This arrangement is convenient for many types of tools but other arrangements might be employed with different types of tool linkages. For example, the crimping mechanisms can be arranged with their axes in side-by-side parallel relationship and facing in the same direction rather than back-to-back. It should be necessary with an alternative arrangement of the crimping mechanisms to provide a wire guiding device which would locate the wires properly in the tool so that the ends would be trimmed as explained above when the connectors are crimped.

In the embodiment of the invention described above, the two pairs 10, 12 are assumed to extend towards each other, the condition which commonly exists when the pairs in two ends of a telephone cable are being spliced. The principles of the invention can also be employed where the two pairs extend beside each other. Under such circumstances, all four wires 2, 4, 6, and 8 would be cut on the same side of the electrical connections (i.e. between the electrical connections and the wire ends). The resulting splices or connections would be butt connections with the two wires in each connection extending in the same direction from the connection. A tool for making such butt connections would be generally similar to the tool shown in the drawing except that all of the wires would extend into the tool from the same side and the wires would be cut on the remaining side. For example, the tool of FIGURES 1–3 could be used to make butt splices between the corresponding wires of two pairs if two of the wires were placed in notch 102 with their ends extending through the notch 110. The remaining two wires would be positioned in the notch 102′ with their ends extending through the notch 110′. All of the wires would be severed in the plane of the lefthand side (as viewed in FIGURES 1 and 3) of the die blocks 62, 62′ but would not be cut in the plane of the right hand side of these die blocks. The notches 102, 110, 102′, 110′ would be modified to accommodate two wires rather than a single wire.

Changes in construction will occurs to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. A method of connecting the corresponding wires of two twisted pairs of wires comprising the steps of separating said pairs at a location adjacent to their ends to form in each pair an open section, positioning a first wire from each pair in alignment with a first open sided crimpable connecting means and the second wire of each pair in alignment with a second open sided crimpable connecting means, moving said wires laterally of their axes relative to said connecting means to locate said wires in said connecting means, crimping said first and second connecting means thereby to connect said first wire of one pair to said first wire of the other pair and to connect said second wire of said one pair to said second wire of said other pair and concomitantly trimming the end portions of said wires which extend beyond said connecting means.

2. A method as set forth in claim 1 wherein said twisted pairs extend axially towards each other, said pairs being positioned in overlapping relationship.

3. The method of connecting the corresponding wires of two pairs of wires to each other and concomitantly trimming the ends of said wires, the two wires of each pair normally extending alongside each other, said method comprising the steps of:

separating the two wires of each pair at a location adjacent to the ends of said pairs, positioning the corresponding wires of the pairs in alignment with two open sided electrical connectors disposed in side-by-side parallel relationship with the end portions of said wires extending beyond said connecting devices, and moving said wires relative to said connectors laterally to position said wires in said connectors and trimming the end portions of said wires which extend beyond said connectors, and crimping said connectors onto the trimmed ends.

4. A method as set forth in claim 3 wherein said pairs extend in opposite directions towards each other.

5. The method of splicing a first cable to a second cable, each cable containing a plurality of associated pairs of conductors, said cables being located adjacent to each other, said method comprising the steps of:

selecting a wire pair from said first cable, selecting a wire pair from said second cable, separating the wires of said pairs, positionnig the corresponding wires of the pairs in alignment with two open-sided electrical connectors, said connectors being disposed in parallel side-by-side relationship, moving said wires laterally of their axes relative to said connectors to position said wires in said connectors, trimming the end portions of said wires which extend beyond said connectors, crimping said connectors onto said wires, and repeating said selecting, separating, positioning, moving, trimming, and crimping operations until all of the pairs in said first cable have been connected to the pairs of said second cable.

References Cited

UNITED STATES PATENTS

| | | | |
|---|---|---|---|
| 411,637 | 9/1889 | Batchelor et al. | 140—111 |
| 1,059,124 | 4/1913 | Doxford | 140—111 |
| 1,936,869 | 11/1933 | Deaver | 173—263 |
| 1,949,593 | 3/1934 | Weissenborn et al. | 140—111 |
| 2,276,571 | 3/1942 | Grypma | 29—461 |
| 2,463,199 | 3/1949 | Peterson | 140—111 |
| 2,509,929 | 5/1950 | Kleinfelder et al. | 154—2.22 |
| 2,549,838 | 4/1951 | Miller | 29—203 |
| 2,563,829 | 8/1951 | Fitzgerald et al. | 29—461 |
| 2,564,463 | 8/1951 | Burns | 29—517 |
| 3,095,468 | 6/1963 | Klein | 174—88 |

RICHARD J. HERBST, *Primary Examiner.*

E. M. COMBS, *Assistant Examiner.*

U.S. Cl. X.R.

29—461, 517, 628